United States Patent [19]
Concepcion

[11] Patent Number: 5,954,158
[45] Date of Patent: Sep. 21, 1999

[54] TREE STAND ADJUSTABLE ADAPTER

[76] Inventor: Eduardo G. Concepcion, 13210 SW. 49th St., Miami, Fla. 33175

[21] Appl. No.: 09/021,559

[22] Filed: Feb. 10, 1998

Related U.S. Application Data

[63] Continuation-in-part of application No. 08/704,937, Aug. 30, 1996, abandoned.

[51] Int. Cl.[6] ........................................... E04G 3/00
[52] U.S. Cl. ............................ 182/187; 182/136
[58] Field of Search ...................... 182/133–136, 182/187–188; 248/523, 524, 230.1, 230.3

[56] References Cited

U.S. PATENT DOCUMENTS

| | | | |
|---|---|---|---|
| 2,437,012 | 3/1948 | White | 182/187 |
| 5,090,506 | 2/1992 | Womack et al. | 182/187 |

OTHER PUBLICATIONS

"The Tree Lounge Advantage," Advanced Hunting Equipment, Inc., 1996.
"Loc–On 1996 Catalog," Loc–On Company, 1995.

*Primary Examiner*—Daniel P. Stodola
*Assistant Examiner*—Hugh B. Thompson
*Attorney, Agent, or Firm*—James R. Young; Chrisman Bynum & Johnson

[57] ABSTRACT

An adjustable adapter for a tree stand has an adjustably moveable contact member mounted on one of two cross members for varying the effective distance between the two cross members on opposite sides of a tree trunk to adjust the tree stand for changing tree trunk diameters. A strut moves the contact member away from one of the cross members toward the other cross member to fit on smaller diameter portions of a tree trunk. Moving the cross member in the opposite direction with the strut accommodates larger tree trunk diameters.

15 Claims, 5 Drawing Sheets

TREE STAND ADJUSTABLE ADAPTER

CROSS REFERENCE TO RELATED PATENT APPLICATION

This patent application is a continuation-in-part of U.S. patent application Ser. No. 08/704,937, filed in the U.S. Patent and Trademark Office on Aug. 30, 1996, now abandoned.

BACKGROUND OF THE INVENTION

1. Field of the Invention

This invention is related to climbing tree stands and more specifically to leveler apparatus for adjusting climbing tree stands to narrower portions of tree trunks as a user climbs higher into trees.

2. State of the Prior Art

Hunters have long enjoyed the advantages offered by a higher position. Being above the ground gives a greater field of vision, protection from the elements, and makes the hunter harder to detect.

Original hunting stands were raised platforms, often built against or around trees. Such platforms were fixed structures. Although the hunter enjoyed the advantages of height, the area around the tree stand was soon depleted of game, the tree stand accumulated the hunter's scent from use to use, and the tree stand could not be moved or adjusted easily.

Climbing tree stands offer several advantages over fixed hunting stands. An obvious advantage is that of mobility. A hunter can use the climbing tree stand on virtually any tree that has a trunk which is not interrupted by low branches. With such mobility, depletion of game from a specific area can be avoided, and the area will not accumulate the hunter's scent. In addition, the tree stand can theoretically be used to climb very high into a tree.

A typical climbing tree stand comprises a pair of frames that fit around a tree trunk. Each frame has two ends, a front end and a back end, and two cross-bars, a front cross-bar at the front end of the frame and a rear cross-bar at the rear end of the frame such that the front cross-bar and the rear cross-bar are spaced apart from each other in a manner that allows the front cross bar to be positioned on one side of the tree trunk and the rear cross-bar to be positioned in a diametrically opposite side of the tree trunk. Both cross-bars are usually connected together by two lateral frame members that are positioned on diametrically opposite lateral sides of the trunk from each other. When the hunter puts his weight on the front end of one of the frames, that frame tilts in relation to the tree trunk so that the front cross-bar and the rear cross-bar are both forced or wedged against the tree trunk, resulting in enough friction between the cross-bars and the tree trunk to support the hunter's weight.

Using two frames allows the hunter to climb the tree. As the hunter stands on a lower frame and holds an upper frame in his hands, he can lift the upper frame as high as he can reach safely, and then he can hold himself on the upper frame, thereby locking the upper frame to the tree with his weight, as described above, while he lifts the lower frame with his feet. He can then stand again with his weight on the lower frame and repeat the process.

The tree stand must be adjusted to the width of the tree trunk, because the angle at which the tree stand will engage and remain on the tree trunk is determined by how much the distances between the two cross-bars exceeds the diameter of the trunk. Existing tree stands address this problem by allowing one of the cross-bars of the tree stand to be adjusted closer to, or farther from the other cross-bar, often by bolts that attach the cross-bar to the rest of the frame. For a larger diameter tree trunk, the cross-bar is moved farther away from the other cross-bar and bolted in place. For a smaller diameter tree trunk, the cross-bar can be moved closer to the other cross-bar to make the distance between the cross-bars correspondingly smaller.

The higher one climbs on a tree, the smaller in diameter the trunk becomes. Many existing tree stands cannot adjust for such changing diameter easily. This deficiency can result in the hunter having insufficient control over the angle of the frame in relation to the tree trunk, thus the angle at which he will sit when he reaches his desired height on the tree trunk. Such angle will be determined by the cross-bar positions he set before beginning his climb. The tree stand will engage the tree trunk and be oriented at steeper and steeper angles in relation to the tree trunk, the higher the hunter climbs. Consequently, such existing tree stands limit the hunter's comfort and safety, and they limit the height to which the hunter can climb with his stand.

It is usually quite precarious to remove the bolts that are used to set the cross-bars, when the tree stand and the hunter have climbed high above the ground. The hunter is often as high as 40 feet above the ground, standing on the lower frame or hanging from the upper frame. To unbolt the adjustable cross-bar requires two hands, so the hunter would be unable to also use his hands to grasp anything securely while unbolting and readjusting a cross-bar. If the hunter should lose his balance while fiddling with two bolts and a bar on the opposite side of the tree, he or she could fall and be injured severely.

Savvy hunters are able to extend their climbing ranges, and, to some extent, control the angle at which the tree stand is positioned when they have reached their desired height assembling their stands initially as high as they can reach on the tree trunk, while they are still standing on the ground, and then they laboriously pull themselves up to the stand to begin the climbing process. Once at their desired height, some hunters insert wood wedges between the tree trunks and the cross-bars, effectively widening the tree trunk to a desired width, and thereby controlling the tree stand angle in relation to the tree trunk. The dangers of this practice are obvious: the hunter depends on that wedge for his very life, because the tree stand will at least shift violently if the wedge becomes dislodged.

Hunters need a better way to adjust or level their tree stands while climbing in order to extend their climbing ranges and to allow for greater comfort and safety when finally positioned at a desired angle. However, such adjustment must be operable while the hunter can still hold onto either the frame or the tree itself, thus it must be convenient to adjust with one hand while leaving the hunter's other hand free to grasp the frame or the tree for support.

Accordingly, it is an object of this invention to provide a convenient mechanism for adjusting a tree stand to a tree trunk with one hand.

SUMMARY OF THE INVENTION

Additional objects, advantages, and novel features of the invention shall be set forth in part in the description that follows, and in part will become apparent to those skilled in the art upon examination of the following or may be learned by the practice of the invention. The objects and the advantages may be realized and attained by means of the instrumentalities and in combinations particularly pointed out in the appended claims. To achieve the foregoing and other objects and in accordance with the purposes of the present invention, as embodied and broadly described herein, the apparatus of this invention may comprise a tree stand adapter with a first cross member, a second cross member, and an angle or level adjustment mechanism comprising a contact member mounted slidably on one of the cross members and a extendable and retractable strut extending between the one cross member and the contact member for adjustably separating and distancing the contact member in relation to the cross members.

BRIEF DESCRIPTION OF THE DRAWINGS

The accompanying drawings, which are incorporated in and form a part of the specification, illustrate the preferred embodiments of the present invention, and together with the descriptions serve to explain the principles of the invention. In the Drawings

DETAILED DESCRIPTION OF THE PREFERRED EMBODIMENTS

Figure 1:
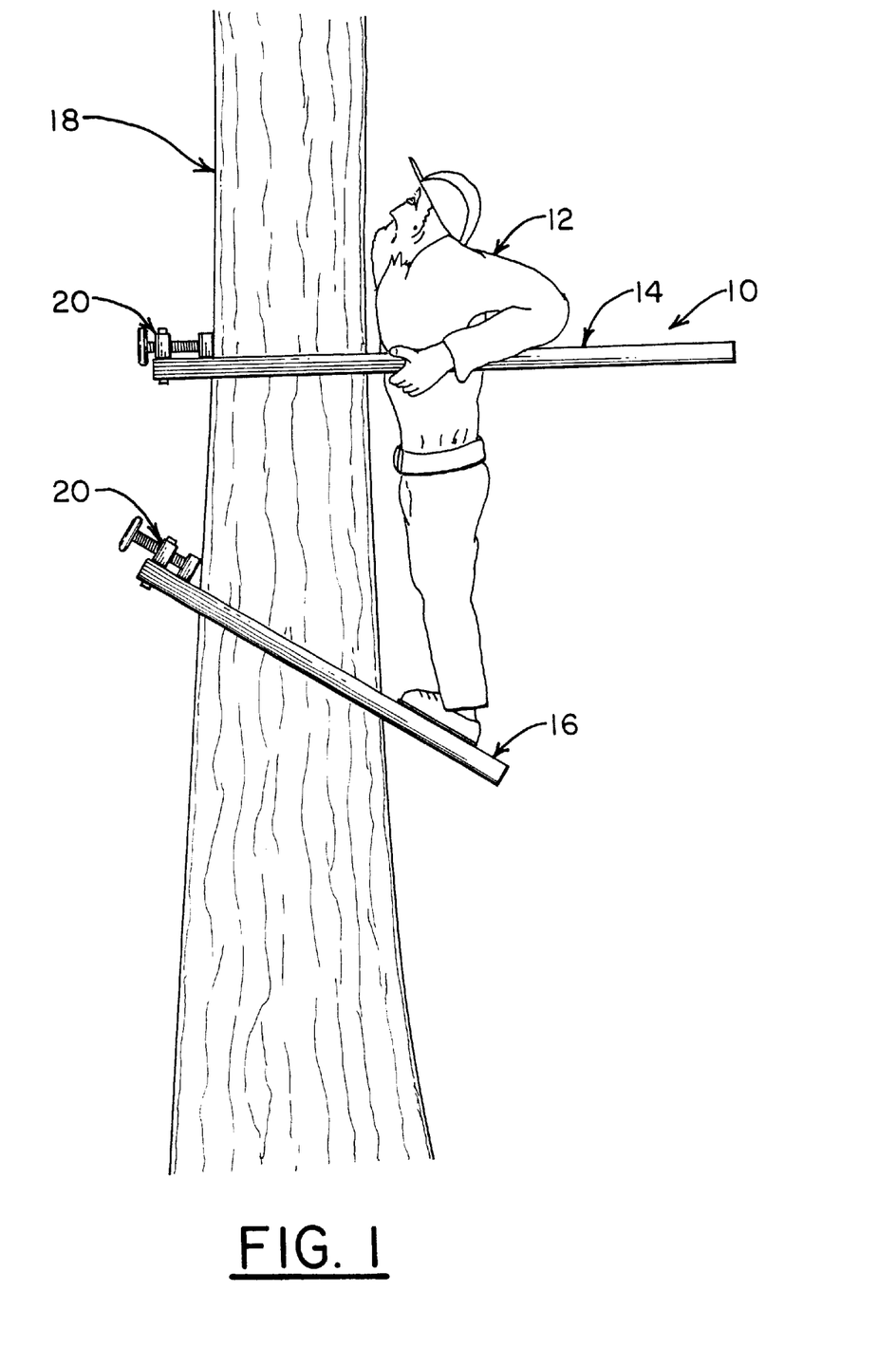
FIG. 1 is a side elevation view of a hunter climbing a tree using a climbing tree stand equipped with the angle adjustment mechanism of this invention.

A tree stand incorporating an adjustment adapter 20 according to a preferred embodiment of the present invention is shown generally in FIG. 1 as it is used by a hunter to climb to his desired position on a tree trunk 18. The tree stand 10, typical of climbing tree stands in general, use two separate frames, an upper frame 14 and a lower frame 16.

A preferred embodiment of the adjustment adapter 20 of the present invention is attached to the upper frame 14, preferably on the opposite side of the tree trunk 18 from the hunter 12, were it can be used by the hunter 12 with his arm around the tree trunk 18 when adjusting the adapter 20. An adjustment adapter 20 may also be used on the lower frame 16, which would allow climbing angle of the lower frame 16 to also be adjusted to the diameter of the tree trunk 18 in much the same manner as will be described below for adjusting the upper frame 14. Then the adjustment adapter 20 is opposite the hunter 12, the hunter 12 can operate it while maintaining his balance with his arm around the tree trunk 18. However, the adapter 20 can also be positioned on the upper frame 14 on the same side of the tree trunk 18 as the hunter 12, as will be described in more detail below, or on any side of the frame 14 that contacts the tree trunk 18.

Figure 2:
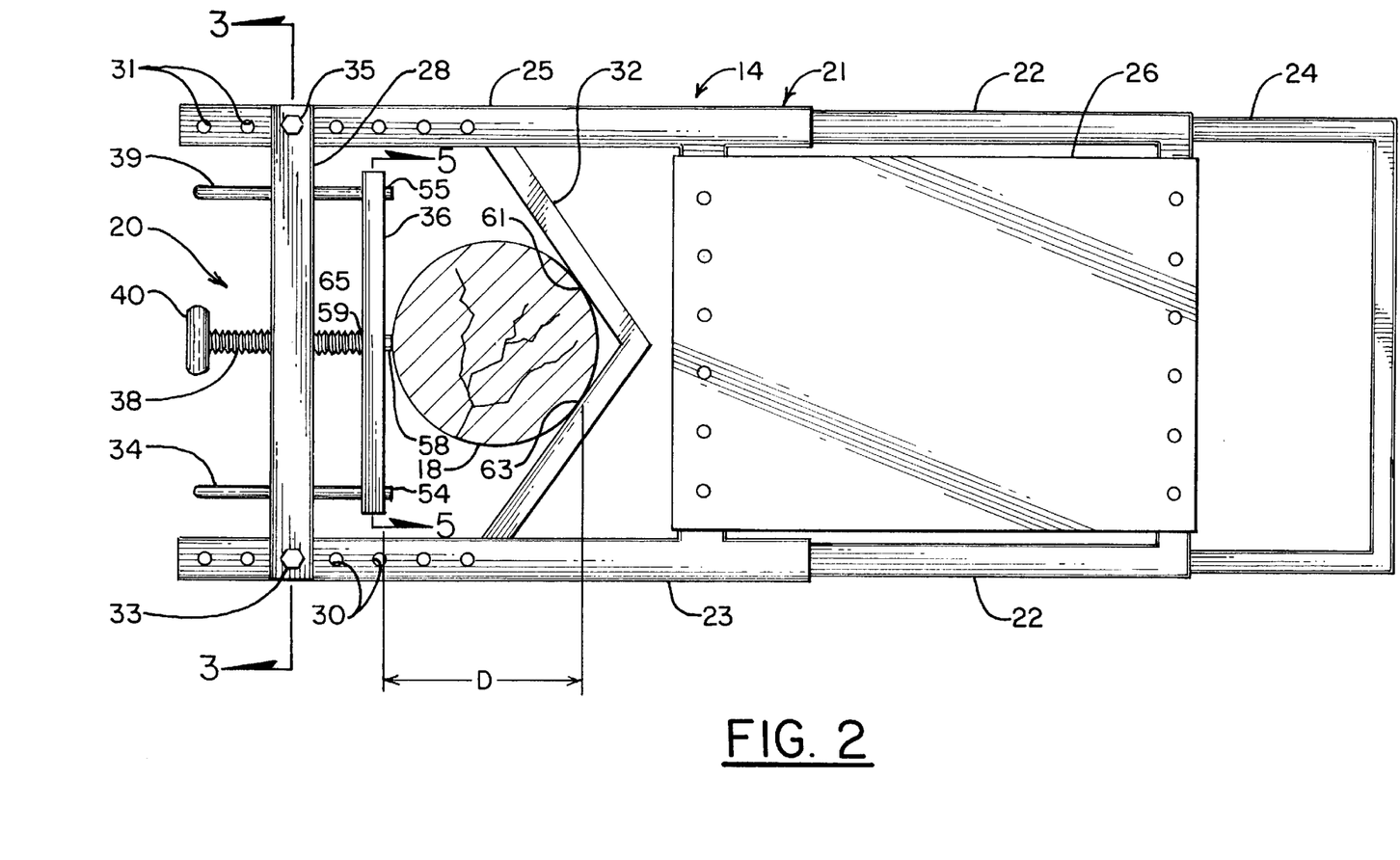
FIG. 2 is a top plan view of the upper one of two frames of the tree stand shown in FIG. 1.

The adapter 20 is shown in more detail in the top plan view of FIG. 2 attached to an upper frame 14 of a Tree Lounge™ tree stand manufactured by Advanced Hunting Equipment. Inc., of Cumming, Ga. The example Tree Lounge™ tree stand upper frame 14 in FIG. 2 is a telescoping structure, which includes a first telescopic member 22 that is slidable into and out of a main member 21 and a second telescopic member 24 that slides into and out of the first telescopic member 22. When installed on a tree trunk 18 and raised to a desired elevation above the ground, the hunter 12 (not shown in FIG. 2) can sit on the platform or seat 26, and he may use the second telescopic member 24 as a foot rest. For weight reduction, this and other tree stands often use hollow aluminum frames, such as 6061-T6 aircraft aluminum.

Before climbing a tree, the hunter 12 first positions the main member 21 sans the first cross member 28 on the tree trunk 18 with a second cross member 32 positioned adjacent the tree trunk 18. The hunter 12 then positions the first cross member 28 on the opposite side of the tree trunk 18 from the second cross member 32 along a series of holes 30, 31 on respective lateral sides 23, 25 of the main frame member 21 and fastens the first cross member 28 into place on the main frame member 21 at a desired location with bolts 33, 35. The second cross member 32, which is shown for example, but not for limitation, as an angled cross member, extends between the lateral sides 23, 25 and is used in combination with the first cross member 28 to apply counter pressure and therefore gripping frictional engagement against the tree trunk 18. It is generally not sufficient for stability to grip the tree trunk 18 at two points, because two contact points would leave the tree stand 10 free to pivot about the two contact points and tip the hunter 12 out of the seat 26. Therefore, this and many other conventional tree stands generally contact and grip the tree trunk 18 at three points, using an angled member, such as the second cross member 32, opposite a straight one, such as the first cross member 28, to provide the three contact points 61, 63, 65. As will be discussed below, the adjustable adapter 20 of the present invention is equally suitable for angled as for straight cross members.

Since it is dangerous to attempt to unbolt the first cross member 28 from the main frame member 21 while climbing to adjust the effective distance D between the first cross member 28 and the second cross member 32 to compensate for changing tree trunk 18 diameter while climbing, the adjustable adapter 20 of the present invention allows the effective distance D to be adjusted without any significant increased risk of the hunter 12 falling while making the adjustment. The tree stand 10 with the adjustable adapter 20 never has to be opened during adjustment, so it cannot escape the tree trunk 18.

While the adjustable adapter 20 is designed primarily as a retrofit adapter for existing tree stand frames to make them more easily adjustable, the operative adjustable components of adapter 20 can also be provided with and incorporated into new tree stands as they are manufactured without departing from the scope of this invention. Therefore, while the word "adapter" is used for convenience in this description, it is not intended to limit the invention to retrofit components. Also, when this specification discusses angle adjustment, it is referring to adjustment of the angle of tree stand 10 in relation to the tree trunk 18. Further, while this description focuses primarily on the use of the adjustable adapter 20 on the upper frame 14, it is equally applicable to lower frames 16.

The preferred embodiment adjustable adapter 20 of the present invention comprises a tree contact member 36 that is mounted on one of the cross members 28, 32 in a position substantially between cross members 28, 32 and in a manner that is adjustably moveable toward and away from the first cross member 28, thus also toward and away from the second cross member 32 and, consequently, toward and away from the tree trunk 18. This travel can be controlled by any of a number of mechanical actuators, such as a hydraulic ram (not shown), a 20 scissors jack (not shown). a screw jack (not shown), a level or combination of levers (not shown), or by a simple screw 38, as illustrated in FIG. 2. For simplicity in this description, such actuator for moving the contact member 36 in relation to the cross members 28, 32 is called an extendable and retractable strut, even though it can be any one of those particular mechanisms or other mechanisms that provide the same function. The extendable and retractable strut illustrated in FIG. 2 is a screw 38, preferably a ¾" aluminum screw. The screw 38 extends and retracts in relation to the first cross member 28 by operation of a handle 40 on the proximal end of screw 38 to rotate screw 38. Note that the preferred embodiment adjustable adapter 20 of the present invention requires only a single handle 40 so the hunter 12 still has a free hand to hold onto the climbing tree stand 10 or onto the tree trunk 18 while operating the handle 40 with the other hand. This feature helps prevent injury that could result from the hunter 12 falling, as might happen if the hunter 12 had to operate the adjustment mechanism 20 with both hands. In the preferred embodiment, at least one, and preferably two stabilizers, such as elongated guides 34, 39 extend from the contact member 36 and slidably through the first cross member 28 to support the contact member 36 both vertically and laterally, while allowing the longitudinal movement actuated by the extendable and retractable strut, for example, screw 38, toward and away from the first cross member 28. Such guides may not be necessary with other kinds of extendable and retractable struts, such as a scissors jack (not shown) or other more rigid or sturdy strut structures.

Figure 3:
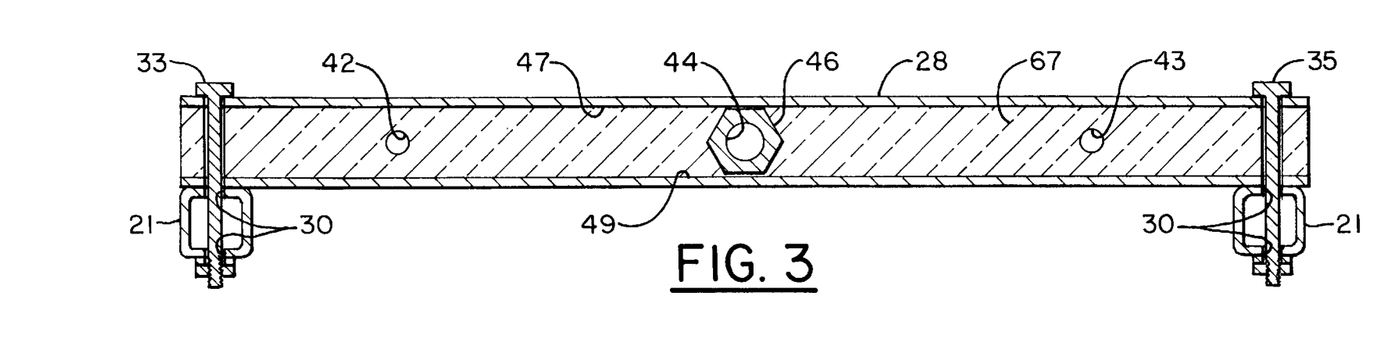
FIG. 3 is a cross-sectional view of the upper frame taken along line 3—3 of FIG. 2, showing assembly of a cross member that is bolted to the frame including parts of an angle or level adjustment mechanism according to the present invention.

The first cross member 28 is preferably, but not necessarily, an aircraft grade 3/16" aluminum tube of rectangular 1½" by 2" cross-section, shown in a lengthwise section in FIG. 3 with the two guide holes 42, 43 and the screw hole 44 are depicted. Because the screw 38 must travel through the first cross member 28 while being anchored longitudinally to first cross member 28, a threaded nut 46 is positioned inside the cross member 28 in axial alignment with the screw hole 44. The peripheral shape and size of the nut 46 engages the top 47 and bottom 49 of the first cross member 28 to prevent the nut 46 from turning in the cross member 28. Alternatively, the nut 46 could be welded on the cross member 28 or fastened in any other appropriate manner. The nut 46 is preferably made of aluminum for weight savings, corrosion resistance, and because aluminum welds best against aluminum. The guides 34, 39 the screw 38, and the handle 40 are also preferably made of aluminum.

With the screw 38 used as the extendable and retractable strut, the adjustable adapter 20 of the present invention is infinitely adjustable within the range of the screw 38, allowing the hunter 12 to select the exact desired angle at which the tree stand 10 will rest on the tree trunk 18. The precision of adjustment is limited only by the accuracy of the hunter 12, and it may likewise be traded off with speed of operation by increasing the "speed" of the screw 38, for example by using a steeper pitched thread. The thread must, of course, match that of the nut 46 used.

An alternative to the screw 38 and handle 40 might be an electric motor (not shown) operated by a switch (not shown) within the hunter's range of motion. Because hunting often requires a certain stealth, such an electric motor and the screw should be adapted to operate silently. For this same reason, in a preferred embodiment the first cross member 28, if made of hollow aluminum, is preferably filled with foam 67 for sound damping and for slight additional durability. Likewise a push lever that ratchets (not shown) in several positions can be used instead of the screw 38. This option and other means of lockably changing the distance D should be considered part of the present invention, as well as other means known to those skilled in the art.

Figure 4:
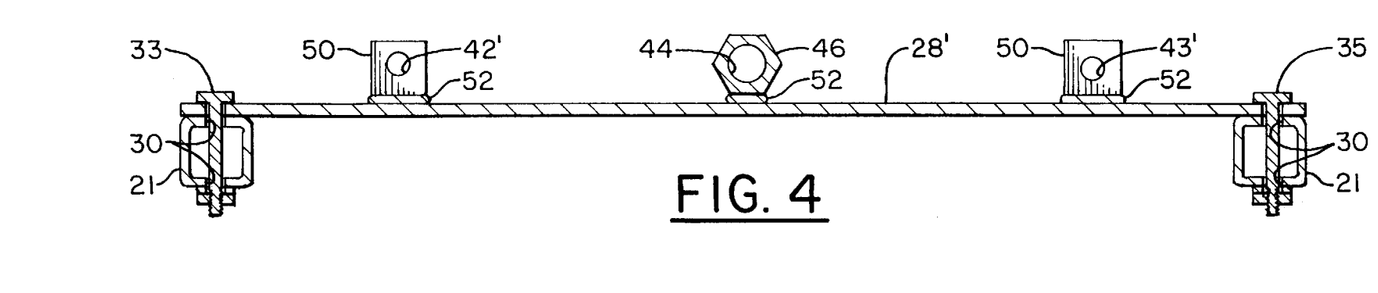
FIG. 4 is a cross-sectional view of an alternative embodiment of the cross member in FIG. 3 including parts of an angle adjustment mechanism according to the present invention.

An alternative embodiment of the first cross member 28' is shown in FIG. 4, which shows the guide holes 42', 43' and screw hole 44' passing outside the first cross member 28'. In this alternative embodiment, the guide holes 42', 43' must pass through ears 50 or the like, which are welded to the first cross member 28' by weld lines 52. This example shows that a wide range of shapes of the first cross member 28 can be adapted to the adjustable adapter 20 within the scope of the present invention. While the first cross member 28 is preferably rigid, as shown in FIGS. 3 and 4, it could also be comprised partially or entirely of a flexible structure, such as chain (not shown) or cable (not shown).

Figure 5:
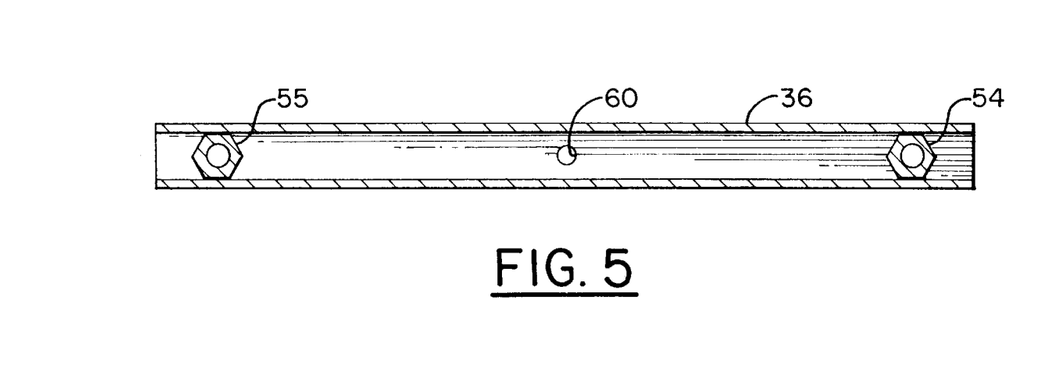
FIG. 5 is a cross-sectional view of the contact member that is moved toward or away from the trunk of the tree, taken along line 5—5 of FIG. 2.

The contact member 36, preferably, but not necessarily, a hollow aluminum bar of rectangular cross-section, is shown in FIG. 5 with the guides 34, 39, once they pass through holes in the contact member 36, affixed to the contact member 36 by spot welding 54, 55 on the opposite side of contact member 36 so that they extend rigidly from contact member toward the first cross member 28. Other means of locking the guides 34, 39 rigidly in place known to persons skilled in the art, including, for example, glue, nuts, or other fasteners (not shown) may likewise be employed. Each guide 34, 39 is preferably a ⅜" smooth aluminum rod. These guides 34, 39 could also be molded in a unitary manner with contact member 36, such as with a tough, rigid plastic, as would be obvious to persons skilled in the art, once they understand the principles of this invention. The contact member 36 could also have a narrowed edge (not shown) for engaging the tree trunk 18.

Because the screw 38 must rotate, a preferred, but not necessary, method of holding the threaded end 59 of the screw 38 in fixed spatial relation to the contact member 36 while allowing rotation of the screw 38 involves drilling a hole (not shown) axially into the threaded distal end 59 of screw 38 for receiving a smaller retainer pin, such as screw 58, shown in FIG. 2, which passes through a hole 60 in the contact member 36. Hole 60 is preferably smaller in diameter than the distal end of screw 38, so the screw 38 will abut and push against the contact member 36 around hole 60 to move the contact member 36 away from the first cross member 28 and toward the second cross member 32 when the screw 38 is rotated in one angular direction and to hold whatever adjusted distances between the first cross member 28 and the contact member 36 and between the contact member 36 and the second cross member 32 are desired and set by screw 38, when the contact member 36 and the second cross member 32 are wedged against the tree trunk 18 by the weight of the hunter 12 on frame member 14. When the screw 38 is screwed back, the head on the smaller screw 58 bearing on the contact member 36 around the hole 60 operates to pull the contact member 36 with it away from the second cross member 32 and toward the first cross member 28. While attachment of screw 38 to contact member 36 with this smaller screw 58 is a preferred embodiment of the adjustable adapter 20 of this invention, other means, such as rivets, nails, thrust bearings, and the like, may be employed to hold the screw 38 to contact member 36.

Figure 6:
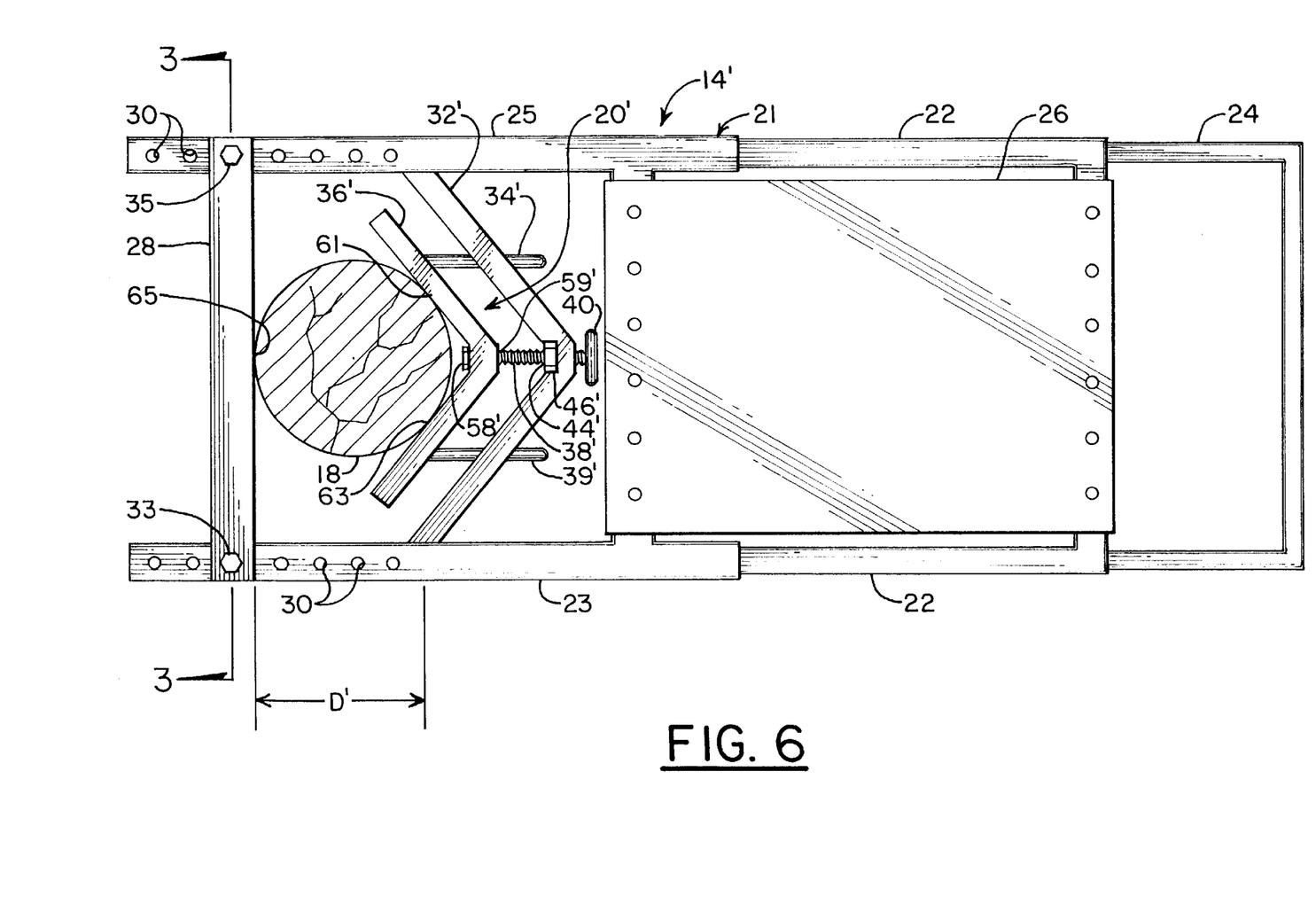
FIG. 6 is a top plan view of another alternate embodiment of the angle adjustment mechanism of this invention shown mounted on the cross member that is on the same side of the tree as the seat or platform.

In an alternate preferred embodiment upper frame member 14', illustrated in FIG. 6, the adjustable adapter 20' is mounted on the second cross member 32', instead of the first cross member 28, so that it is positionable on the same side of the tree trunk 18 as the platform or seat 26. In this embodiment, the contact member 36', mounted slidably by elongated guides 34', 39' on second cross member 32' is driven by an extendable and retractable strut, shown in FIG. 6 as a screw 38', to vary the distance D' between the contact member 36' and the first cross member 28. Other components of the adjustable adapter 20', such as threaded nut 46', handle 40', and smaller pin or screw 58' in distal end 59' of screw 38' function in much the same manner as corresponding components in the preferred embodiment adjustable adapter 20 in FIG. 2.

Figure 7:
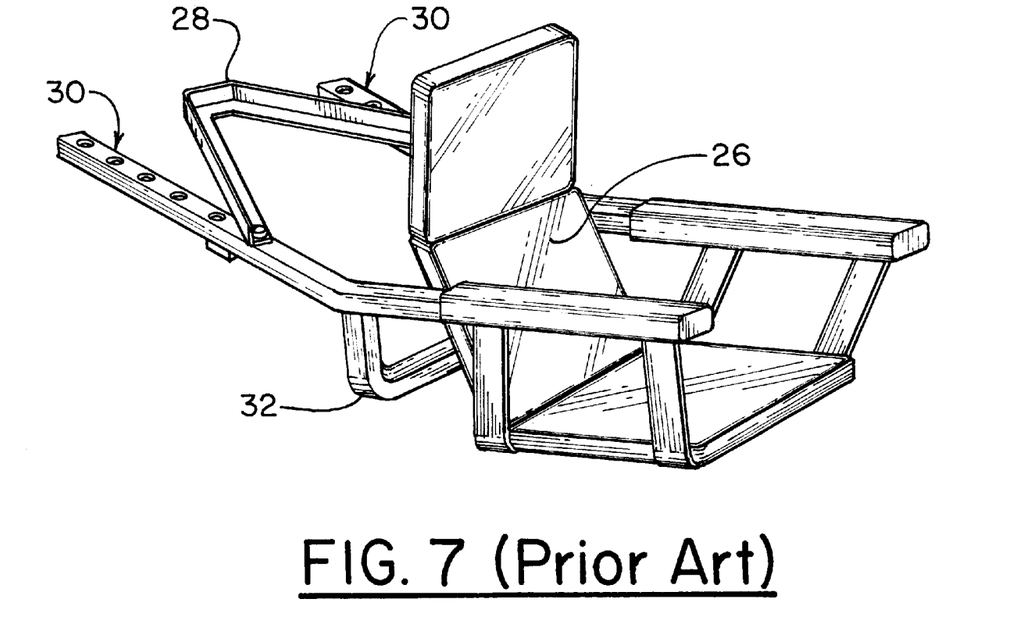
FIG. 7 is a view of another example of an existing, well-known upper frame of a tree stand.
Figure 8:
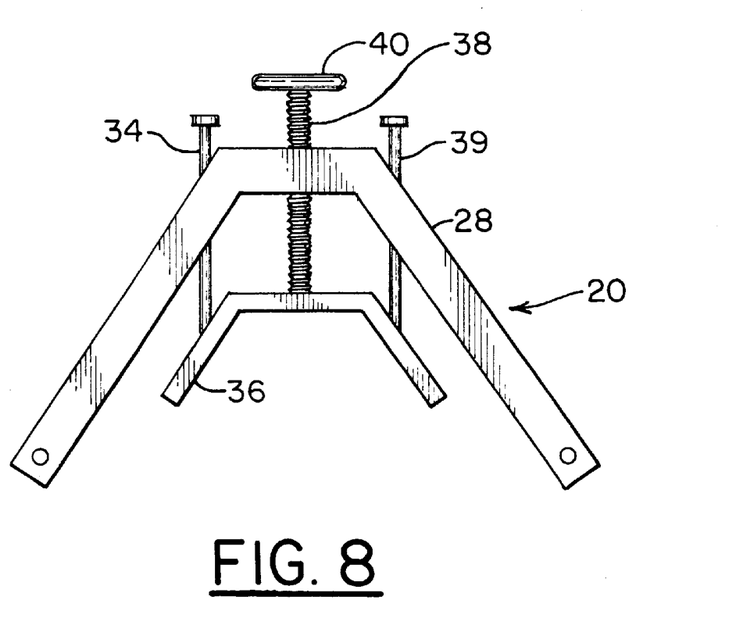
FIG. 8 is a top elevation of an alternative embodiment of the angle adjustment mechanism of this invention adapted to the upper frame of FIG. 7.

Another example of a commercially available climbing tree stand, in this case the Signature™ manufactured by Summit, is depicted in FIG. 7. In this alternative embodiment, the first cross member 28 is angled. For such tree stands with angled first cross members 28, the alternative embodiment of the adjustable adapter 20 shown in FIG. 8 is suitable. With the exception that the first cross member 28 is angled, all other details are essentially as described above. Other shapes of the adjustable adapter 20 will likewise suggest themselves to those skilled in the art, once they understand this invention.

While the weight savings of aluminum are praised throughout this description, other materials have similar strength and weight, including steel, certain plastics, ceramics, etc., are considered substitutes for the aluminum used here.

The foregoing description is considered as illustrative only of the principles of the invention. Furthermore, since a number modifications and changes will readily occur to those skilled in the art, it is not desired to limit the invention to the exact construction and process shown described above. Accordingly, all suitable modifications and equivalents may be resorted to falling within the scope of the invention as defined by the claims which follow.

I claim:

1. A tree stand apparatus having two elongated lateral frame members that can be positioned on diametrically opposite lateral sides of a tree trunk, a first cross member and a second cross member that are spaced apart in relation to each other and extend between the two elongated lateral frame member s such that the tree stand apparatus can be positioned with the first cross member and the second cross member on diametrically opposite sides of the tree trunk, and a platform attached to the lateral frame members, the improvement comprising:

a contact member mounted on said first cross member in a position between the first cross member and the second cross member with an extendable and retractable strut extending between and connected to the first cross member and the contact member; and an elongated guide extending from the contact member and slidably through the first cross member, said elongated guide being oriented parallel to, and laterally offset from the strut.

2. The improvement of claim 1, wherein said strut includes a screw extending through and threadedly engaged with a nut mounted on the first cross member, said screw having a proximal end with a handle positioned on one side of the nut and a distal end rotatably connected to the contact member.

3. The improvement of claim 2, wherein said contact member has a hole that is aligned axially with the screw, said hole being smaller in diameter than the distal end of said screw, and the improvement further including a retainer pin extending through the hole in the contact member into attachment to the distal end of the screw.

4. The improvement of claim 3, wherein said screw has a hole that is smaller in diameter than the hole in the contact member extending into the distal end of the screw, and wherein said pin is a smaller screw extending through the hole in the contact member into the hole in the distal end.

5. The improvement of claim 1, wherein the lateral offset of the elongated guide is in a first direction from the strut, and further including a second elongated guide extending from the contact member and slidably through the first cross member in parallel, laterally spaced relation in a second direction that is opposite said first direction from the strut.

6. A tree stand apparatus having two elongated lateral frame members that can be positioned on diametrically opposite lateral sides of a tree trunk, a first cross member and a second cross member that are spaced apart in relation to each other and extend between the two elongated lateral frame members such that the tree stand apparatus can be positioned with the first cross member and the second cross member on diametrically opposite sides of the tree trunk, and a platform attached to the lateral frame members, the improvement comprising:

a contact member mounted on said second cross member in a position between the second cross member and the first cross member with an extendable and retractable strut extending between and connected to the second cross member and the contact member; and an elongated guide extending from the contact member and slidably through the second cross member, said elongated guide being oriented parallel to, and laterally offset from the strut.

7. The improvement of claim 6, wherein said strut includes a screw extending through and threadedly engaged with a nut mounted on the second cross member, said screw having a proximal end with a handle positioned on one side of the nut and a distal end rotatably connected to the contact member.

8. The improvement of claim 7 wherein said contact member has a hole that is aligned axially with the screw, said hole being smaller in diameter than the distal end of said screw, and the improvement further including a retainer pin extending through the hole in the contact member into attachment to the distal end of the screw.

9. The improvement of claim 8, wherein said screw has a hole that is smaller in diameter than the hole in the contact member extending into the distal end of the screw, and wherein said pin is a smaller screw extending through the hole in the contact member into the hole in the distal end.

10. The improvement of claim 6, wherein the lateral offset of the elongated guide is in a first direction from the strut, and further including a second elongated guide extending from the contact member and slidably through the second cross member in parallel, laterally spaced relation in a second direction that is opposite said first direction from the strut.

11. A tree stand having two elongated lateral frame members that can be positioned on diametrically opposite lateral sides of a tree trunk, a first cross member and a second cross member that are spaced apart in relation to each other and extend between the two elongated lateral frame members such that the two elongated frame members are positionable on diametrically opposite sides of the tree trunk, and a platform attached to the lateral frame members, the tree stand comprising:

a contact member adapted to frictionally engage a first side of the tree trunk, said contact member being mounted on said first cross member in a position between the first cross member and the second cross member with both an extendable and retractable strut and a stabilizer laterally offset from the strut extending between and engaged with the first cross member and the contact member, the contact member being adapted for frictionally engaging a second side of the tree trunk opposite the first side.

12. The tree stand of claim 11, wherein said stabilizer is an elongated guide extending from the contact member and slidably through the first cross member, the elongated guide being oriented parallel to, and laterally offset from, the strut.

13. The tree stand of claim 11, wherein said stabilizer includes a first and a second stabilizer, wherein the first stabilizer is an elongated guide extending from the contact member and slidably through the first cross member in parallel, laterally spaced relation in a first direction from the strut and the second stabilizer is an elongated guide extending from the contact member and slidably through the first cross member in parallel, laterally spaced relation in a second direction from the strut that is opposite the first direction.

14. The tree stand of claim 11 wherein the strut includes a screw extending through and threadedly engaged with a nut mounted on the first cross member, the screw having a proximal end with a handle positioned on one side of the nut and a distal end rotatably connected to the contact member.

15. The tree stand of claim 11, wherein the first cross member is substantially parallel to the second cross member, and the stabilizer is supported by the first cross member and extends substantially parallel to the strut between the contact member and the first cross member, the stabilizer being extendable and retractable relative to the first cross member.

* * * * *